US009508169B2

(12) United States Patent
Ofstad et al.

(10) Patent No.: US 9,508,169 B2
(45) Date of Patent: Nov. 29, 2016

(54) METHOD AND APPARATUS FOR CONTEXTUALLY VARYING AMOUNTS OF IMAGERY ON A MAP

(75) Inventors: Andrew Ofstad, San Francisco, CA (US); Willem Van Lancker, New York, NY (US); Matthew R. Simpson, San Francisco, CA (US); Bernhard Seefeld, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 776 days.

(21) Appl. No.: 13/616,227

(22) Filed: Sep. 14, 2012

(65) Prior Publication Data

US 2015/0123999 A1 May 7, 2015

(51) Int. Cl.
| | |
|---|---|
| *G06T 11/60* | (2006.01) |
| *G09G 5/00* | (2006.01) |
| *G06F 3/0484* | (2013.01) |
| *G06F 3/0482* | (2013.01) |
| *G09G 5/377* | (2006.01) |
| *G01C 21/32* | (2006.01) |
| *G06T 11/00* | (2006.01) |
| *G09B 29/10* | (2006.01) |
| *G06F 3/147* | (2006.01) |

(52) U.S. Cl.
CPC ............... *G06T 11/60* (2013.01); *G01C 21/32* (2013.01); *G06F 3/0482* (2013.01); *G06F 3/04842* (2013.01); *G06T 11/00* (2013.01); *G09B 29/106* (2013.01); *G09G 5/377* (2013.01); *G06F 3/147* (2013.01); *G06T 2200/24* (2013.01); *G09G 2340/12* (2013.01); *G09G 2354/00* (2013.01)

(58) Field of Classification Search
CPC ............... G09G 5/14; G09G 2340/10; G09G 2340/125
See application file for complete search history.

(56) References Cited

U.S. PATENT DOCUMENTS

| | | | |
|---|---|---|---|
| 8,103,445 B2 | 1/2012 | Smith et al. | |
| 2003/0182052 A1* | 9/2003 | DeLorme et al. | 701/201 |
| 2011/0046881 A1* | 2/2011 | Karaoguz | 701/208 |

OTHER PUBLICATIONS

Bing Maps (2012). Retrieved from the Internet on Feb. 28, 2012: URL incomplete.
Brothercake, "Image Transitions 2.0, Version 2.0," (May 8, 2011). Retrieved from the Internet on Dec. 17, 2012: URL:http://www.brothercake.com/site/resources/scripts/transitions/.
Google Maps (2012). Retrieved from the Internet on Dec. 17, 2012: URL:http://maps.google.com/maps?hl=en&tab=wl.
Microsoft Office©, "Add Transitions Between Slides," (2012). Retrieved from the Internet on Dec. 17, 2012: URL:http://office.microsoft.com/en-us/powerpoint-help/add-transitions-between-slides-HA010107771.aspx.
Yelp, "Cinemas Chicago, IL 60603," Search performed May 30, 2013. Retrieved from the Internet on May 30, 2013: URL:<http://www.yelp.com/search?find_desc=cinemas&find_loc=Chicago%2C+IL+60603&ns=1&ls=c79b1dc7f6a426e0.

* cited by examiner

*Primary Examiner* — Michelle Chin
(74) *Attorney, Agent, or Firm* — Marshall, Gerstein & Borun LLP (57) ABSTRACT

A user interface for a map display application used on a computing device includes a strip of photographic images corresponding to objects located within a geographic location represented by a map displayed on a screen. More specifically, the strip of photographic images is responsive to the viewing experience of the user.

20 Claims, 8 Drawing Sheets

METHOD AND APPARATUS FOR CONTEXTUALLY VARYING AMOUNTS OF IMAGERY ON A MAP

FIELD OF DISCLOSURE

This disclosure relates to user interfaces, and more specifically, to displaying map imagery on a display screen.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Maps are visual representations of information pertaining to the geographical location of natural and man-made structures. A traditional map, such as a road map, includes roads, railroads, hills, rivers, lakes, and towns within a prescribed geographic region. Maps were customarily displayed on a plane, such as paper and the like, and are now also commonly displayed via map applications on computing devices, such as computers, tablets, and mobile phones.

Many map applications provide the user with the ability to select the type of map information or features to be visible or hidden from view as well as to adjust the display of the map. For example, the user may select among several scales and map viewing modes, such as a map mode that presents a traditional road-map view, a satellite mode that presents a photograph taken above the geographical region, or a street-level mode that presents a photograph taken of the surrounding area at ground level.

Maps displayed on computing devices are able to provide information not available from traditional paper maps. In particular, computing devices may provide the user with a photographic image of an object located within the boundary of the map that may be displayed on the screen. For example, a small visual indicator such as a thumbnail image may be displayed along with the map. The thumbnail image denotes that a photograph associated with a particular object physically located within the geographical area represented by the map is available for viewing. Upon the user's selection of the thumbnail image, the associated photograph will be displayed on the screen.

Although providing additional map information to the user can improve the map viewing experience, the manner in which the additional information is provided may interfere or distract the user's attention from the map. Thus, a need remains for providing additional map-related information to the viewer in a manner that is more responsive and complementary during the map viewing session.

SUMMARY

An apparatus for displaying overlay imagery on a map includes, in one example embodiment, a computing device for a map rendering system that is capable of being communicatively coupled to a map displaying device having a user interface. The computing device includes a processor, a memory coupled to the processor, and a port coupled to the processor that receives a request for map information. The computing device includes a map generating routine that generates a map responsive to a request for map information, wherein the generated map includes a visual representation of a geographic area associated with the request for map information. A memory or database stores images wherein each stored image is associated with an object having a geographic location. An image identifying routine identifies images stored within the database that are associated with objects located within or near the geographic area represented by the map. An image rating routine rates the identified images using at least one viewing signal to rate each image. The viewing signals include: an image type, an object location, an image quality, an image popularity, a map viewing mode, a user location, a spatial perspective, and a search term. A runway generating routine generates a plurality of identified images for display with the map, wherein the plurality of identified images are arranged in the runway in a sequence determined by the rating of each identified image. A communication routine transmits the map and the runway to the map display device for display via the user interface.

If desired, the computing device may include a sizing routine that adjusts the size of the dimension of the runway or at least one of the plurality of identified images displayed within the runway based on the rating of at least one of the plurality of identified images within the runway. Additionally, at least one identified image within the runway may be selectable as an entry point into a different map viewing mode.

In another example embodiment, a method for use in a computing device for displaying overlay imagery associated with a map includes receiving a request for map information, generating a map corresponding to the request, wherein the generated map includes a visual representation of a geographic area, and displaying the generated map on a screen in a map viewing mode. The method includes identifying images of objects located within or near the geographic area associated with the map displayed on the screen and rating each of the identified images using one or more viewing signals, wherein the viewing signals include: image type, object location, image quality, image popularity, map viewing mode, user location, spatial perspective, and search term. The method includes generating a runway of a plurality of the identified images, wherein the plurality of the identified images are arranged in the runway in a sequence determined by the rating associated with each identified image, and displaying at least a portion of the generated runway on the screen.

If desired, the method may also include determining a size for displaying the plurality of the identified images of the runway based on the rating of at least one of the plurality of the identified images of the runway, displaying an image on the screen in response to receiving a selection of one of the identified images of the runway, and/or adjusting the size of the plurality of the identified images of the runway in response to receiving an adjustment of the runway from a user. The method may further include fixing the size of the plurality of the identified images of the runway in response to receiving the adjustment of the runway from the user, and displaying a second map on the screen in response to receiving a selection of one of the identified images of the runway, wherein displaying the second map on the screen includes changing the map viewing mode. The method may further include displaying a user-selectable map view image in the runway, and displaying the map in a different map viewing mode in response to receiving a selection of the user-selectable map view image from the user. The method may further include displaying a user-selectable composite view image in the runway, and displaying the images of the runway in a grid on the screen in response to receiving a selection of the user-selectable composite view image from the user.

In another example embodiment, a method for use in displaying overlay imagery associated with a map on an electronic device includes receiving a request for map information via a user interface of the electronic device, sending the request for map information to a server device, and storing a map corresponding to the request for map information, the map including a visual representation of a geographic area. The method includes displaying the map on a screen in a map viewing mode, and receiving images of objects located within or near the geographic area associated with the map displayed on the screen, wherein each image has a rating based on one or more viewing signals. The viewing signals include: image type, object location, image quality, image popularity, map viewing mode, user location, spatial perspective, and search term. The method includes receiving a size for displaying the plurality of the images based on the rating of at least one image in the plurality of the images, and displaying at least a portion of the plurality of the images at the size on the screen.

In yet another example embodiment, a computer-readable storage medium includes computer-readable instructions stored thereon that are to be executed on a processor of a computing device for a map rendering system. The stored instructions include generating a map in response to receiving a request for map information, the map including a visual representation of a geographic location, transmitting the map for display, and identifying images of objects located within the geographic location associated with the map. The stored instructions include rating each of the identified images using one or more viewing signals, the viewing signals including image type, object location, image quality, image popularity, map viewing mode, spatial perspective, and user location. The stored instructions include generating a runway of a plurality of the identified images wherein the plurality of the identified images are arranged in the runway in a sequence determined by the rating associated with each identified image. The stored instructions include transmitting the runway for display.

If desired, the stored instructions may further include determining a size for displaying the plurality of the identified images of the runway based on the rating of at least one of the plurality of the identified images of the runway, adjusting the size of the plurality of the identified images of the runway in response to receiving an adjustment of the runway from a user, and/or fixing the size of the plurality of the identified images of the runway in response to receiving the adjustment of the runway from a user. The stored instructions may further include generating a second map in response to receiving a selection of one of the identified images of the runway, transmitting the second map for display wherein the request for map information includes a search term, and/or displaying the selected plurality of the images in a grid on the screen in response to receiving a selection of the user-selectable composite view image from the user.

DETAILED DESCRIPTION

Using the techniques described herein, a map display system presents information for display on a screen in a manner that will enhance the map browsing experience of a user. As the user browses a map displayed on a screen, the system or method identifies images of objects located within a geographic location represented by the map. The identified images are rated using one or more viewing signals and a collection of rated images are selected for display based on the respective rating of each identified image. The viewing signals used to rate the identified images include image type, object location, image quality, image popularity, map viewing mode, user location, spatial perspective, and search term. Displayed along with the map, the collection of rated images appear as a strip of images called a runway and the sequence and/or size of the images within the runway may be determined by the respective rating of one or more images within the runway.

In one implementation, the user's level of interest in map information may be assessed by considering the map browsing characteristics employed by the user. For example, if the user chooses to display the map in a satellite mode at a relatively low elevation, the user's level of interest pertaining to map information may be evaluated as being more concerned in photographic imagery of objects located within the geographic region represented by the map. In this instance, the runway and its images may be presented in an expanded display to provide imagery consistent with the user's map interests. On the other hand, when the map is viewed in a map mode, e.g., road map view, and at a relatively high elevation, the user's level of interest in map information may be evaluated as being more concerned with travel directions, locations, and routes. The display of the runway and its images will accordingly be reduced (in relation to the expanded display described above) to avoid distracting the user from focusing on the spatial aspects map.

Figure 1:
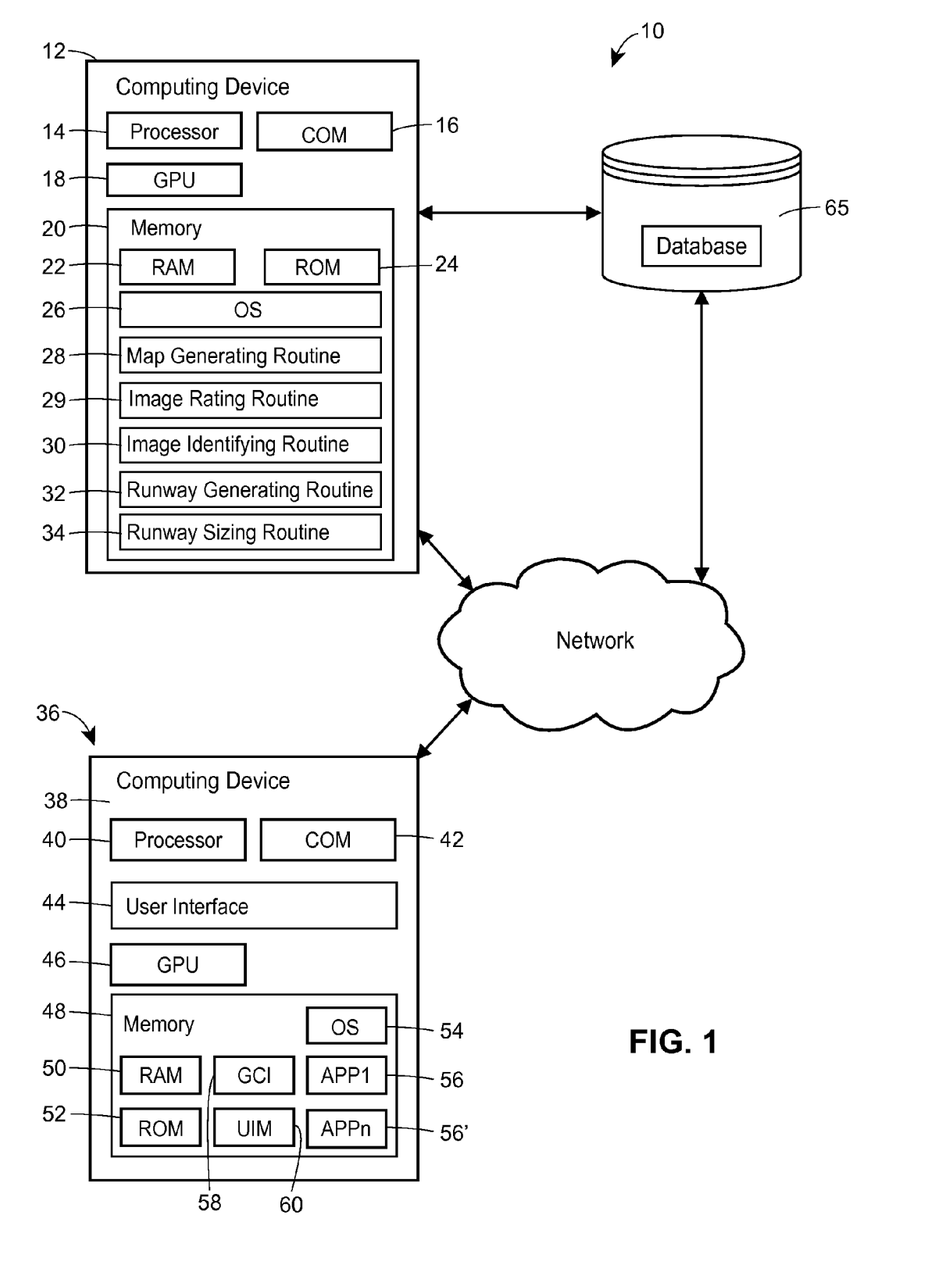
FIG. 1 is a block diagram of an example display system that implements the techniques of the present disclosure to display a map on a display screen.

An example map display system 10 capable of implementing some or all of the techniques herein described is shown in FIG. 1. The map display system 10 includes a computing device 12. The computing device 12 is shown to be a server device, e.g., computer, but it is to be understood that the computing device 12 may be any other type of computing device, including, and not limited to, a main frame or a network of one or more operatively connected computers. The computing device 12 includes various modules, which may be implemented using hardware, software, or a combination of hardware and software. The modules include at least one central processing unit (CPU) or processor 14, a communication module (COM) 16, and a graphics processing unit (GPU) 18. The communication module 16 is capable of facilitating wired and/or wireless communication with the computing device 12 via any known means of communication, such as Internet, Ethernet, 3G, 4G, GSM, WiFi, Bluetooth, etc.

The computing device 12 also includes a memory 20, which may include any type of memory capable of being incorporated with the computing device 12, including random access memory 22 (RAM), read only memory 24 (ROM), and flash memory. Stored within the memory 20 is an operating system 26 (OS) and one or more applications or modules. The operating system 26 may be any type of operating system that may be executed on the computing device 12 and capable of working in conjunction with the CPU 14 to execute the applications.

One application 28 is a map generating application or routine that is capable of generating a map for display on a screen. The map generating application 28 is stored in memory 20 and may include additional routines or cooperate with additional routines to facilitate the generation and the display of map information. The additional routines may use location-based information associated with the geographic region to be mapped. In particular, the location-based information may be photographic images of objects that are physically located within or near the geographic region to be mapped. The photographic images may be stored in one or more memories, databases 65, or repositories accessible to the map rendering system.

An image identifying routine 30 may identify all the photographic images associated with objects located within the geographic region represented by the map that are accessible to the computing device 12. A runway generating routine 32 may cooperate with the image identifying routine 30 to create a runway or strip of images associated with the objects located within the mapped area. The runway generating routine 32 may include or cooperate with an image rating routine 29, wherein visual signals are used to rate the identified photographic images. The visual signals include one or more of the following: image type, object location, image quality, image popularity, map viewing mode, viewer location, and search term. The runway generating routine 32 may also include or cooperate with a runway sizing routine 34, wherein the size or dimension of the runway or at least one image therein is determined for displaying on a screen.

The generated map and runway are sent via the communication module 16 from the computing device 12 to a display system 36. The map and runway may be sent to the display system 36 individually or together, at the same time or at a different time. The display system 36 includes a computing device 38 such as a computer, tablet, or phone. The computing device 38 of the display system 36 is communicatively connected to the computing device 12 of the map display system 10 in a client-server relationship wherein the computing device 10 may be described as the server device and the computing device 38 may be described as the client device.

In one example embodiment, the client computing device 38 includes a processor (CPU) 40, a communication module (COM) 42, a user interface (UI) 44, and a graphic processing unit (GPU) 46. The client computing device 38 also includes a memory 48, which may include any type of memory capable of being incorporated with the client computing device 38, including random access memory 50 (RAM), read only memory 52 (ROM), and flash memory. Stored within the memory 48 is an operating system (OS) 54 and at least one application 56, 56', both of which may be executed by the processor 40. The operating system 54 may be any type of operating system capable of being executed by the client computing device 36. A graphic card interface module (GCI) 58 and a user interface module (UIM) 60 are also stored in the memory 48. The user interface 44 may include an output module, e.g., screen 62 (not shown in FIG. 1) and an input module (not shown), e.g., keyboard, mouse, microphone. At least one of the applications 56, 56' is capable of facilitating display of the map, runway, and photographic images received from the computing device 12 onto the screen 62.

In one example implementation, the application 56 is a web browser that controls a browser window provided by the OS 54 and displayed on the user interface 44. During operation, the web browser 56 retrieves a resource, such as a web page, from a web server (not shown) via a wide area network (e.g., the Internet). The resource may include content such as text, images, video, interactive scripts, etc. and describe the layout and visual attributes of the content using HTML or another a suitable mark-up language. Additionally, the resource requests that a portion of the browser window be allocated for display of map data and images on a runway, and provides an application programming interface (API) for accessing the map data and the image data from the computing device 12. Once the computing device 36 receives the resource, the application 56 displays the received content in the browser window, allocates a portion of the window in the form of an embedded window for display of map data and the runway with images, and executes the API to retrieve the map data and the image data and render the received data within the embedded window. Thus, according to this implementation, the computing device 12 specifies how map data is to be displayed as well as how the images are to be displayed over (or next to) the map image within the embedded window on the computing device 36. In other words, the application 56 obtains map data and image data from the same resource and renders both types of data within the same window using the same API, according to this example implementation.

Several example methods for facilitating the display of overlay imagery associated with a map on an electronic device, which may be implemented by the components described in FIG. 1, are discussed next with reference to FIGS. 2 and 3. As one example, the methods may be implemented as computer programs stored on a tangible, non-transitory computer-readable medium (such as one or several hard disk drives) and executable on one or several processors. Although the methods shown in FIGS. 2 and 3 can be executed on individual computers, such as servers or personal computers (PCs), it is also possible to implement at least some of these methods in a distributed manner using several computers, e.g., using a cloud computing environment.

Figure 2:
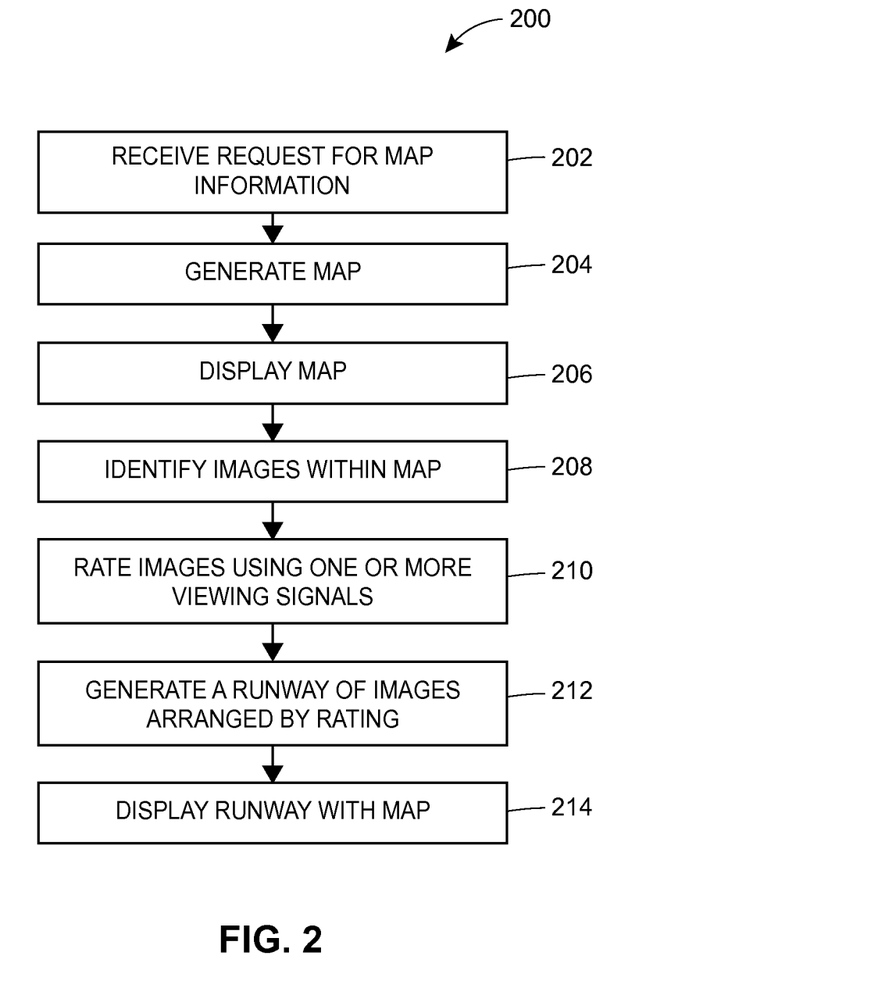
FIG. 2 is a flow diagram of an example method for displaying map information within a window on the display screen of a user interface.

FIG. 2 is a flow diagram of an example method 200 for use in displaying overlay imagery associated with a map. The method 200 may be implemented in the map display system 10 shown if FIG. 1. In one example embodiment, the method 200 may be part of one or more routines stored in the memory 20. A request for map information is received at the computing device 12 (block 202). The request for map information may be initiated in a variety of forms. In one instance, a search request may be submitted by the user inputting a search term into a search box 68 on the display screen 62 (see FIGS. 4-8) of the client computing device 38. The request for map information may also be initiated by the user panning and/or zooming in and/or out of the map displayed on the screen 62, thereby changing the segment of the geographic area of the map represented and made visible on the screen.

In response to the request for map information received at the computing device 12, a map is generated by the map generating routine (block 204). The generated map may include map symbols representing information corresponding to objects located within and/or near the area represented by the map, such as natural and man-made structures, and locations, e.g., cities, towns, streets, etc. Map information corresponding to the generated map is sent via the communication module 16 to the client computing device 38 from which the request for map information was received. The client computing device 38 receives the generated map information via the communication module 42 and the generated map information is then displayed via the CPU 40, GPU 46, UI 44, and/or UIM 60 on the screen 62 (block 206).

Some objects located in or near the geographic area represented by the map may be represented by a symbol displayed within the map. Some objects located in or near geographic area represented by the map may also have one or more corresponding photographic images accessible to the computing device 12. The corresponding photographic images may be stored within an electronic data collection storage component internal or external to the computing device 12, for example, memory 20 of the server computing device 12 and photographic image repositories such as database 65. The server computing device 12 identifies photographic images corresponding to objects located in or near the map shown on the screen (block 208) and rates the identified images based on the photogenic features of the photographic image (block 210).

The aesthetic quality of the photographic images may be quantified by evaluating one or more viewing signals associated with the photographic image and/or the viewing aspects of the user. Each of the viewing signals may be proportionally or disproportionally weighted. A rating associated with one or more of the viewing signals may be assessed to each image and/or an overall rating for the photographic image may be calculated based on one or more of the viewing signals. In general, the higher the score or rating a photographic image receives with respect to the viewing signals, the more likely it is that the user would be interested in viewing the image.

The one or more viewing signals that may be used to rate or assess the identified photographic images include image type, object location, image quality, image popularity, map viewing mode, user location, spatial perspective, and search term. Image type generally includes the file format of the photograph and whether the photograph is a regular or special photograph, e.g., panoramic. For example, with respect to image type, a photographic image having a panoramic type may generally receive a higher rating as compared to a photographic image having a regular type. Object location generally relates to the geographical location of the object associated with the photographic image. For example, with respect to object location, a photographic image having a geographical location near the region being represented by the map displayed on the screen may generally receive a higher rating as compared to a photographic image having a geographical location farther from the region being represented by the map. Image quality generally includes the contrast, color, and/or definition, e.g., amount of pixels, of the photographic image. For example, with respect to image quality, a photographic image having more pixels and color contrast may generally receive a higher rating as compared to a photographic image having less pixels and less color contrast. Image popularity generally includes the consideration of user ratings and/or commentary that may be acquired from social networks, image repositories, etc. For example, with respect to image popularity, a photographic image having a higher viewer rating may generally receive a higher rating as compared to a photographic image having a lower viewer rating. Map viewing mode includes the type of viewing mode the user is utilizing while viewing the map, such as map mode, satellite mode, street-level mode. Map viewing mode may also include the consideration of the zoom level being used by the user. For example, viewing the map at a closer or nearer elevation may indicate that the user is more interested in viewing imagery as compared to transportation routes. User location includes consideration of the location where the user is viewing the map. For example, if the user is located far away from the location being represented by the map, the user may be interested in viewing photographic images of objects frequently associated with tourists and sightseeing. Spatial perspective includes the viewing perspective of the photographic image associated with the object. For example, if several photographic images appear to be taken from a similar perspective, the user may be less interested in viewing such repetitive instances of similar photographic images and a reduced amount of such photographic images may therefore be selected to appear in the runway. Search term generally pertains to the type of search term used in a search initiated by the user. For example, if the search term is an object widely known for its aesthetic features, such as a statue or fountain, the user may be interested in viewing images of other visually appealing objects.

A strip or runway of the identified photographic images is generated by the computing device 12 (block 212) and the runway of images is sent to the client computing device 38 and displayed on the screen 62 along with the generated map (block 214). The photographic images may be arranged within the runway in a sequence determined by the respective rating of each photographic image, e.g., highest to lowest overall rating, highest to lowest rating of a specified viewing signal or group of viewing signals. In addition, the arrangement of photographic images within the runway may also be determined, in part, by considering the overall compilation of photographic images within the runway. In particular, the arrangement of the photographic images in the runway may also be determined by considering the spatial perspective viewing signal associated with each photographic image. For example, many photographic images may be similarly rated or ranked based on one or more of the viewing signals and are therefore likely to be included within the runway. However, some of photographic images may have been taken from a similar viewing perspective, e.g., from a well-known viewing location or spot. It may therefore be preferable, at times, to refrain from placing some or many of the these "duplicative" photographic images having similar perspectives in the runway and instead place other photographic images having different viewing perspectives in the runway to provide the viewer with a more diverse set of photographic images.

Figure 3:
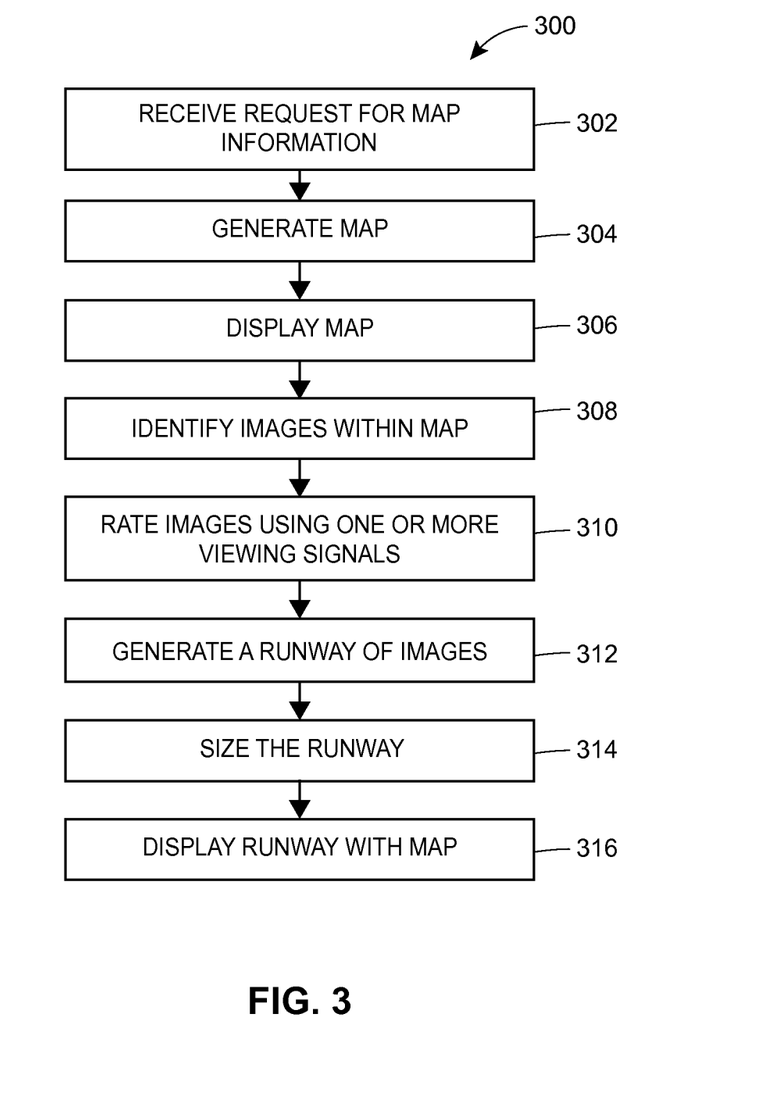
FIG. 3 is a flow diagram of another example method for displaying map information within a window on the display screen of a user interface.

FIG. 3 is a flow diagram of an example method 300 for use in displaying overlay imagery associated with a map. The method 300 may be implemented in the map display system 10 shown if FIG. 1. In one example embodiment, the method 300 may be part of one or more routines stored in the memory 20. A request for map information is received at the computing device 12 (block 302). The request for map information may be initiated in a variety of forms. In one instance, a search request may be submitted by the user inputting a search term into a search box 68 on the display screen 62 (see FIGS. 4-8) of the client computing device 38. The request for map information may also be initiated by the user panning and/or zooming in and/or out of the map displayed on the screen 62, thereby changing the segment of the geographic area of the map represented and made visible on the screen.

In response to the request for map information received at the computing device 12, a map is generated by the map generating routine (block 304). The generated map may include map symbols representing information corresponding to objects located within and/or near the area represented by the map, such as natural and man-made structures, and locations, e.g., cities, towns, streets, etc. Map information corresponding to the generated map is sent via the communication module 16 to the client computing device 38 from which the request for map information was received. The client computing device 38 receives the generated map information via the communication module 42 and the generated map information is then displayed via the CPU 40, GPU 46, UI 44, and/or UIM 60 on the screen 62 (block 306).

Some objects located in or near the geographic area represented by the map may be represented by a symbol displayed within the map. Some objects located in or near geographic area represented by the map may also have one or more corresponding photographic images accessible to the computing device 12. The corresponding photographic images may be stored within an electronic data collection storage component internal or external to the computing device 12, for example, memory 20 of the server computing device 12 and photographic image repositories such as database 65. The server computing device 12 identifies photographic images corresponding to objects located in or near the map shown on the screen (block 308) and rates the identified images based on the photogenic features of the photographic image (block 310).

The aesthetic quality of the photographic images may be quantified by evaluating one or more viewing signals associated with the photographic image and/or the viewing aspects of the user. Each of the viewing signals may be proportional or disproportional weighted. A rating associated with each of the viewing signals may be assessed to each image and/or an overall rating for the photographic image may be calculated based on one or more of the viewing signals. The higher the score or rating a photographic image receives with respect to the viewing signals, the more likely it is that the user would be interested in viewing the image. As described earlier with respect to the example method shown in FIG. 2, the one or more viewing signals that may be used to rate or assess the identified photographic images include image type, object location, image quality, image popularity, map viewing mode, user location, and search term.

A strip or runway of the identified photographic images is generated by the computing device 12 (block 312). The runway of images is then sized (block 314) before being sent to the client computing device 38 and displayed on the screen 62 along with the generated map (block 316). The size of the runway, e.g., photographic images within the runway, may be determined in relation to the ratings assessed to one or more of the photographic images contained within the runway. In particular, if the cumulative rating of all the ratings associated with the photographic images of the runway exceeds a threshold amount, the size of the photographic images displayed on the screen may be larger in comparison to when the cumulative score of the ratings does not exceed the threshold amount.

FIGS. 4-8 illustrate several example interactive screen shots that may be displayed on the screen 62 of the client computing device 38 as a result of the example systems and methods described herein. In general, the computing device 12 may generate information for a map 64 and send the map information to the client computing device 38 for display. The map 64 may typically be displayed at the computing device 38 via a browser application, but may be displayed using a standalone application or another type of application as well. Depending on the configuration of the client computing device 38, the user may interact with the map 64 via the user interface 44 and UIM 60, e.g., a mouse, a touchpad, a keyboard, a touch screen, a voice input device. The map 64 may be displayed in a variety of user-selectable map viewing modes including map mode, satellite mode, and street-level mode. The user may change or switch the map viewing mode by any known user interface technique, such as, drop-down menus and keystroke commands. The dimensions of the map 64 may be adjusted by the user via known UI adjustment mechanisms typically used for adjusting window frames displayed on a screen, such as maximizing and minimizing boxes located in the frame of the window (not shown).

In FIGS. 4-8, the runway 66 is displayed near the bottom of the screen 62 and atop the map 64, however it is to be understood that the runway map be positioned anywhere on the screen and not atop the map, for example. The runway 66 may be displayed in more than one size and includes at least one selectable photographic image or thumbnail. The photographic images within the runway 66 may correspond to one or more objects that are physically located in or near the geographic area being represented by the map 64 displayed on the screen 62. Photographic images of photogenic objects may be more likely to be included in the runway 66. In other words, images of objects that are visually attractive (i.e., as a subject of photography) may be more likely to be rated higher in terms of the viewing signals and therefore may be more likely to be included in the runway 66. For example, an object that is commonly considered a tourist attraction may be more likely to be photographed and shared in social media and repositories. Many of the photographic images corresponding to such an object are also likely to be of a high quality. Such photographic images are therefore likely to be rated higher in regard to the viewing signals as compared to an object that is not commonly considered to be a tourist attraction, such as a bus stop or a nondescript storefront.

Selection by the user of one of the photographic images in the runway 66 will change the display of the map 64 shown on the screen 62. For example, upon the selection of one of the photographic images in the runway 66, the selected photographic image will be displayed on the screen. In addition, one of the images within the runway may be selectable as an entry point into a different viewing mode available to the user. For example, selection of such an entry point may provide the user with the ability to view the map in a different map viewing mode, e.g., satellite view, street-level view. If the street-level viewing mode is selected by the user, the map will be displayed as if the user was positioned on the street-level. Further navigation by the user within the map while in the street-level viewing mode will display images on the screen 62 in a perspective as if the user was moving about on the ground.

Figure 4:
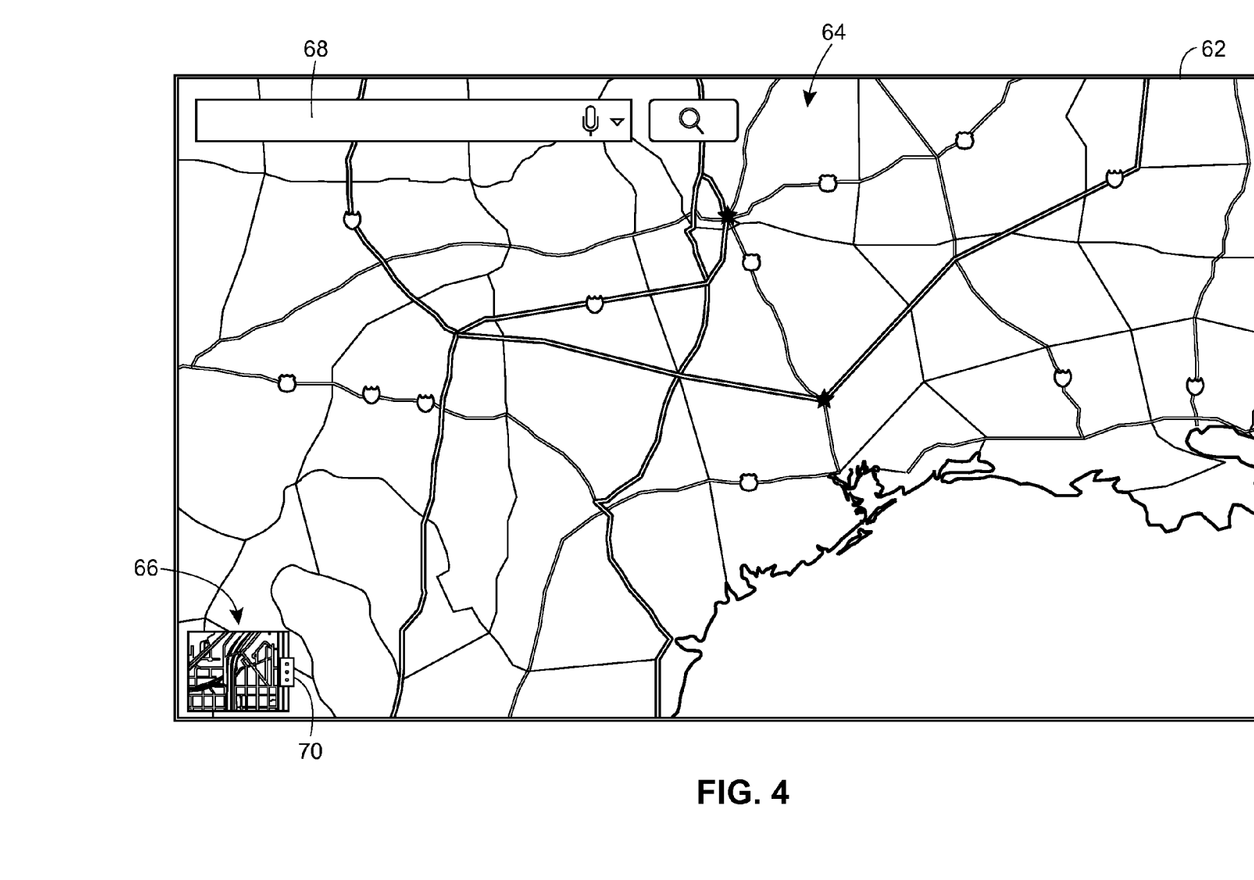
FIG. 4 is an example screenshot of a map displayed on the screen of a user interface.

In the example screenshot illustrated in FIG. 4, the screenshot includes the map 64 shown in map mode, wherein the features depicted within the map are shown in a traditional road-map type format identifying objects, e.g., natural and man-made structures, such as roads, railroads, hills, rivers, lakes, and towns. The user may begin the map viewing session by starting the map application. Initially, the user may use the user interface 44 of the client computing device 38 to request map information by entering a search team into a search text box 68. The user may also request map information by panning the map 64 displayed on the screen 62 or by zooming in or out of the map. In response to the user's request for map information, images of objects physically located in or near the geographic area represented by the map displayed on the screen are identified and rated as described earlier with respect to FIGS. 2 and 3, for example. The runway 66 of identified images is sent to the client computing device 38 and displayed atop the map 64. In the example screenshot illustrated in FIG. 4, the runway 66 includes one user-selectable image, which may be an entry point for selecting or changing the viewing mode. Selection by the user of the image shown in the runway 66 in FIG. 4 will enable the user to change the display of the map to another map viewing mode, such as a satellite mode, wherein the map 64 will change to a photograph taken from an elevation above the geographic region represented by the map.

Changing the area of the map 64 shown on the screen 62 by panning or zooming may likely affect what objects are located within or near the geographic area being represented by the map shown on the screen. The addition or removal of objects associated with the map 64 may therefore affect the corresponding identified photographic images included within the runway 66. As a result, the rating determined for each object's photographic image may change due to the corresponding changes in the viewing signals, e.g., location of object, map viewing mode, etc. As will be explained in more detail below, a user-selectable tab 70 allows a user to set the size of the runway 66. In the example screenshot illustrated in FIG. 5, the viewer has slightly increased the zoom level as compared to the screenshot shown in FIG. 4. As the segment of the map displayed on the screen changes from FIG. 4 to FIG. 5, the amount of objects located in or near the different segment of the map shown on the screen may increase or decrease. As such, the runway 66 shown in FIG. 5 may include more photographic images than the runway shown in FIG. 4.

Figure 5:
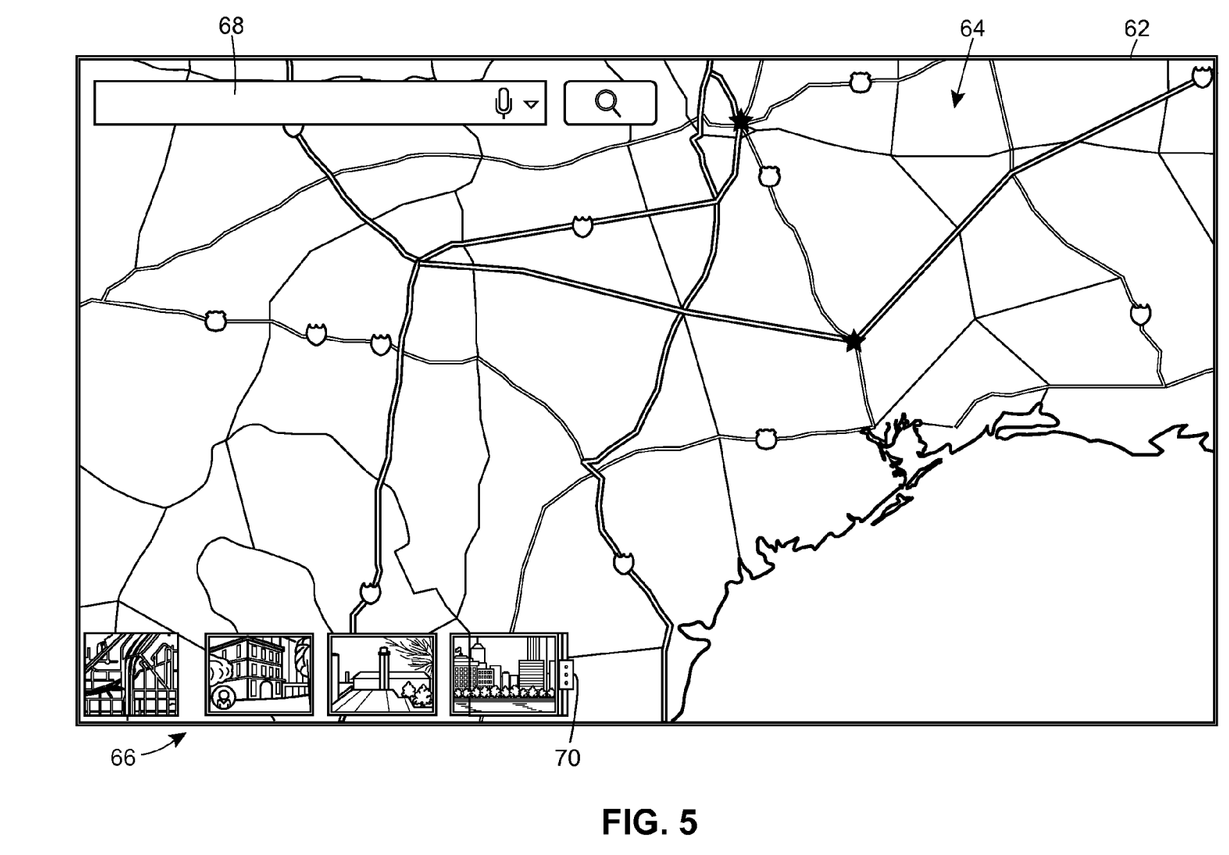
FIG. 5 is an example screenshot of a map displayed on the screen of a user interface.
Figure 6:
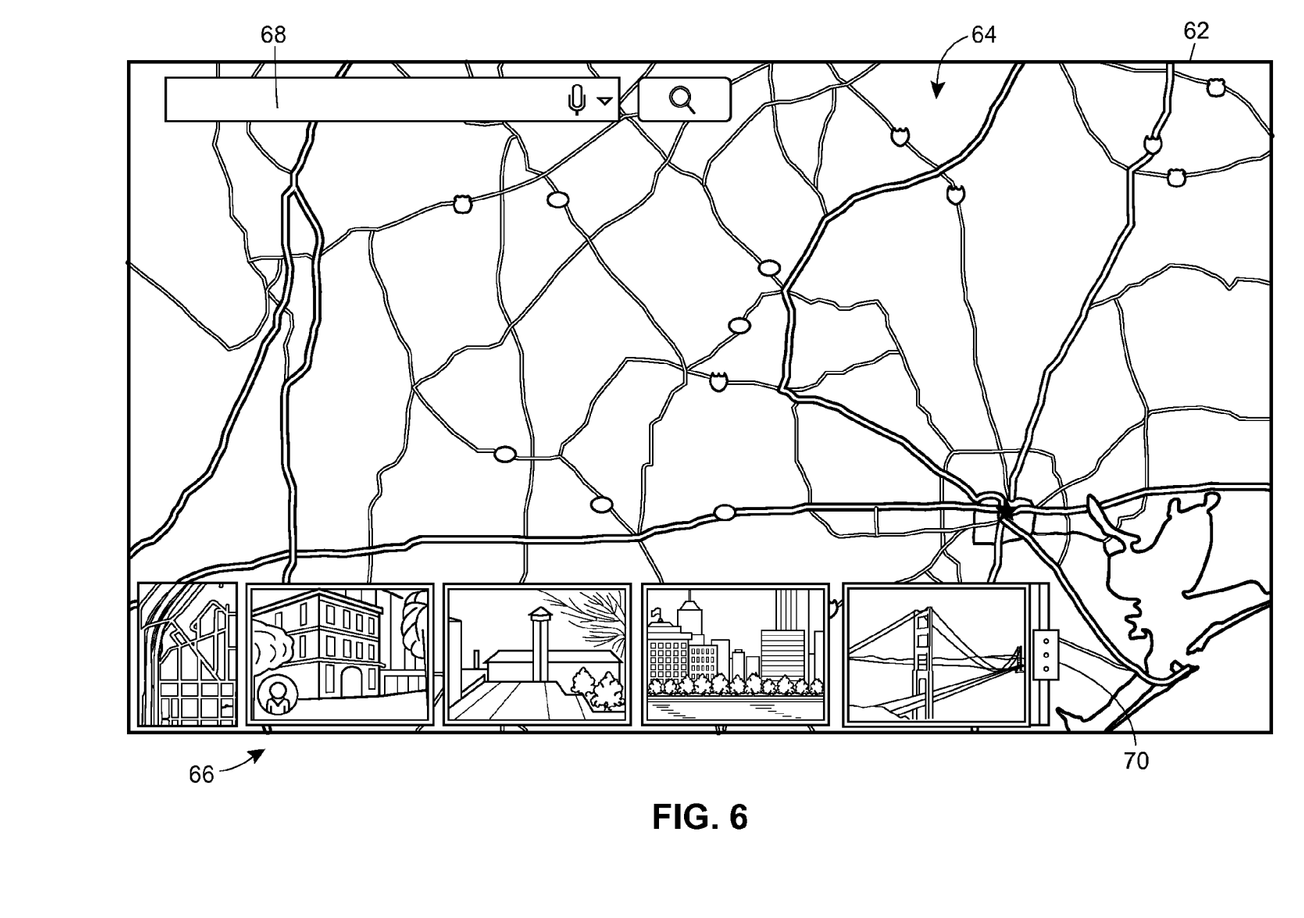
FIG. 6 is an example screenshot of a map displayed on the screen of a user interface.
Figure 7:
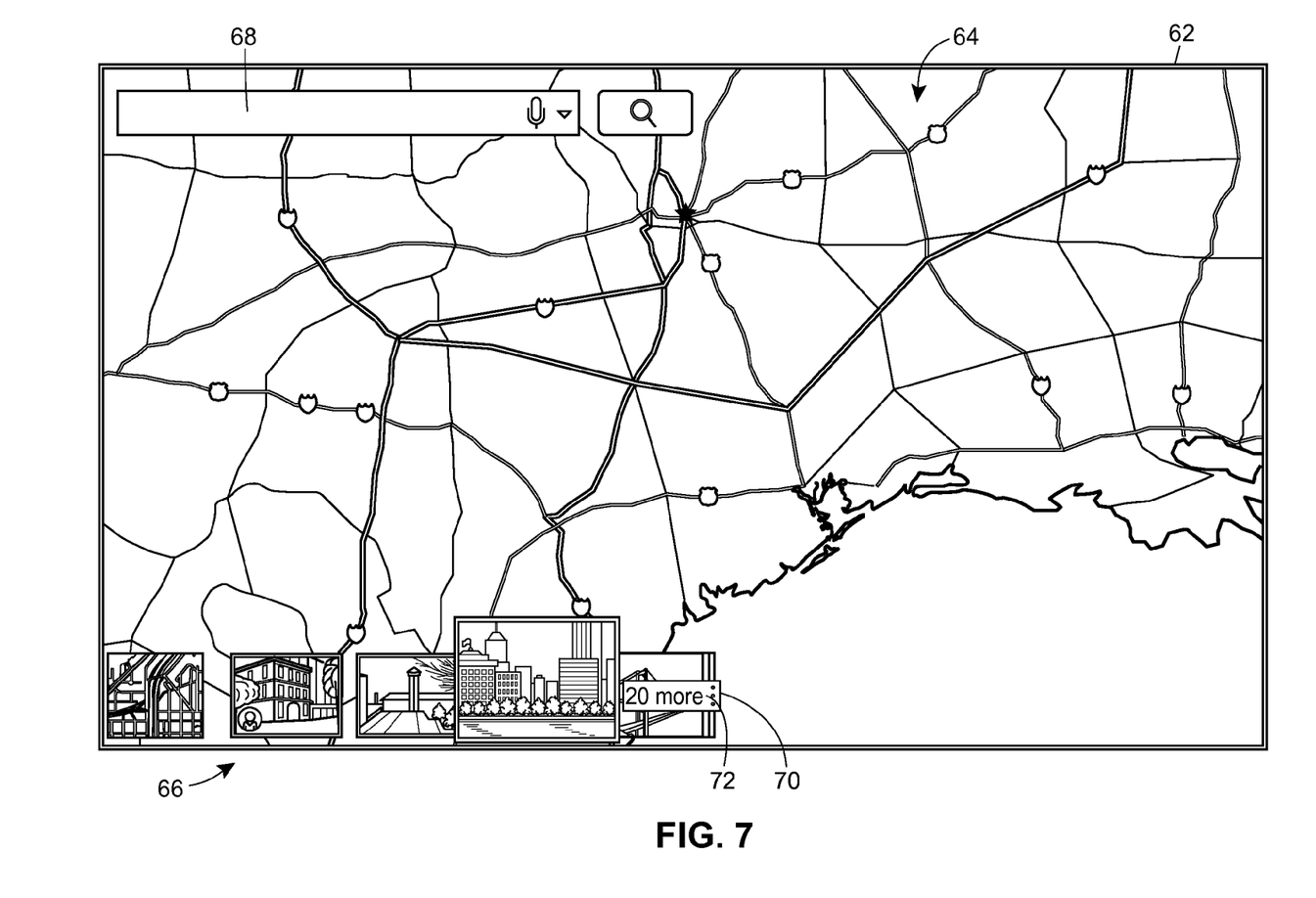
FIG. 7 is an example screenshot of a map displayed on the screen of a user interface.

FIG. 6 illustrates an example screenshot after the user has zoomed slightly further into the map shown in FIG. 5. In FIG. 6, the runway 66 appears larger across the bottom of the map because one or more of the viewing signals have been modified and the ratings of the photographic images may have likely changed. In FIG. 6, the user has zoomed into the map, which may be perceived as the user being more concerned with viewing images of objects associated with the map and less concerned with the routes of transportation or an overview of surrounding terrain. This perception is reflected in the determination of the rating assessed to each photographic image associated with an object located within the geographic location represented by the map. Through the use of the viewing signals and the ratings of the viewing signals, the user viewing FIG. 6 may be perceived to be more interested in viewing photographic images, and therefore, those photographic images likely to be of interest to the user are shown more prominently, e.g., larger, in the runway 66 in FIG. 6 as opposed to the images in the runway shown in FIGS. 4 and 5.

Because the photographic images and the runway are displayed, at least in part, in response to the viewing characteristics employed by the user, the changes to the runway and the photographic images may appear to intuitively occur. In particular, as the user browses or navigates the map 64 displayed on the screen 62, photographic images of objects located in or near the geographic area depicted by the map are identified and rated based on one or more of the viewing signals. The rated photographic images are arranged in the runway and sent to the client computing device 38 to be displayed on the screen 62 in conjunction with the map 64. Further changes by the user to the view of the map 64 displayed on the screen 62, which result in changes to the ratings of identified photographic images, will be reflected by the changes to the photographic images included or removed from the runway 66.

The runway 66 may include one or more user interfaces to provide additional display features to enhance the user's control over the map viewing experience. One display feature for the runway 66 allows the user to deactivate the resizing of the display of the runway 66 on the screen 62 that occurs in response to the ratings determined for the identified photographic images contained within the runway. More specifically, the user-selectable tab 70 or the like is operatively coupled to the user interface module 60 and may be affixed to an edge of the runway 66. By selecting the tab 70, the user may fix the size of the runway 66 displayed with the map 64 and thereby prevent the size of the runway 66 from changing in response to the determination of the ratings associated with the identified photographic images contained within the runway. In other words, fixing the size of the runway will essentially suspend operation of the runway sizing routine 34 wherein the size of the runway will remain constant during the map viewing session, or until such time that the user reinstates the runway sizing routine. The user may select, via the tab 70, to fix the size of the runway 66 to remain in the smaller (see FIG. 5) or larger (see FIG. 6) size.

The runway 66 may also provide the user with the ability to temporarily enlarge a pre-selected thumbnail image contained within the runway 66. See for example, the runway 66 illustrated in FIG. 7. The user may pre-select the thumbnail image by using the user interface 44 and UIM 60 to highlight the desired thumbnail image. The user may highlight the thumbnail image by hovering the mouse pointer over the thumbnail image or by pressing the tab key on the keyboard to pre-select or highlight the thumbnail image. In addition, an indication of the approximate location of the object associated with the pre-selected thumbnail image may be displayed on the map when the thumbnail image within the runway 66 is pre-selected.

Figure 8:
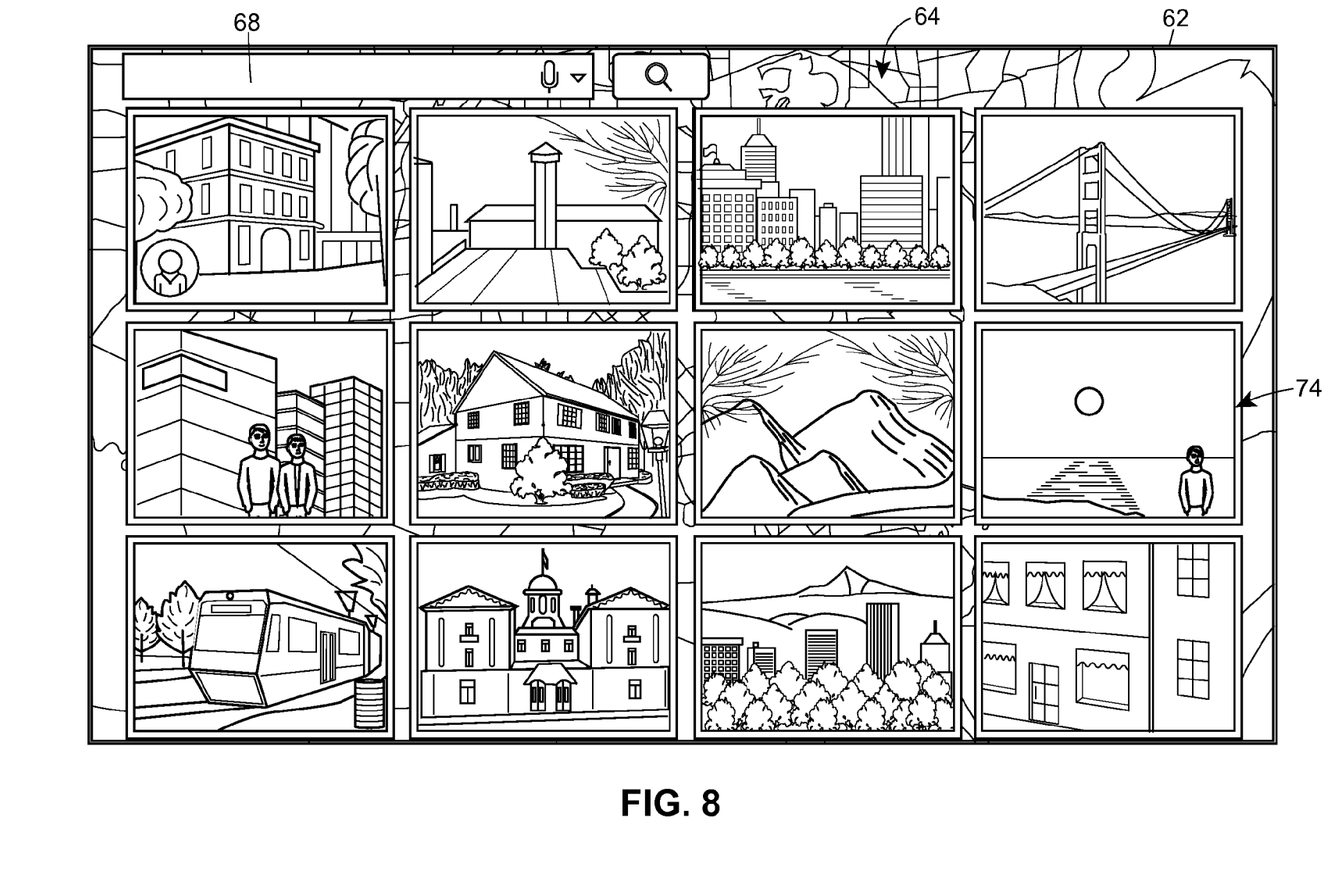
FIG. 8 is an example screenshot of a map displayed on the screen of a user interface.

In instances where there are many photographic images within the runway 66, the runway 66 may extend beyond the width of the screen. The user may horizontally scroll the runway 66 to bring thumbnail images initially not displayed on the screen 62 into view on the screen. In addition, the runway may also provide the user with the ability to display all the photographic images contained within runway 66 in a grid view. The runway 66 may include a user-selectable composite view image or an indicator 72 associated with the runway. The indicator 72 may indicate the amount of photographic images contained within the runway 66. The user may select the indicator 72 to bring about the grid display of the photographic images onto the screen 62 as shown in FIG. 8, for example. Selection of one of the photographic images displayed in the grid will change the display on the screen to show the selected photographic image.

It is apparent from the description above that the user's map viewing experience can be enhanced by the use of the runway of photographic images displayed in combination with the map, wherein the photographic images compiled within the runway are determined in conjunction with the user's viewing characteristics.

In some embodiments, the various sizes of images may be downloaded to the client computing device 38 so that user-initiated runway changes can be accommodated without network access to the computing device 12. Although the embodiments illustrated show image selection and arrangement performed on the server side computing device 12, advancements in client side computing device 38 memory capacity, computing power, and network connectivity are such that these functions are reasonably contemplated as being performed at the client side computing device 38 in some embodiments.

ADDITIONAL CONSIDERATIONS

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for a system and a process for rendering information on a mobile computing device having a display screen through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for use in displaying overlay imagery associated with a map on a screen of a computing device, the method comprising:
    transmitting, by one or more processors, a request for map information;
    receiving, by one or more processors, map information in response to the request for map information;
    generating a map from the received map information, the map including a visual representation of a geographic area;
    displaying the map on the screen;
    identifying, by one or more processors, photographic images of objects located within the geographic area associated with the map displayed on the screen;
    rating, by one or more processors, each of the identified images using one or more viewing signals, the viewing signals including image type, image quality, image popularity, and spatial perspective;
    generating a runway of a plurality of the identified images, the runway being an arrangement of images to be displayed on the map, the plurality of the identified images being arranged in the runway in a sequence determined by the rating associated with each identified image; and
    displaying the runway over the map.

2. The method of claim 1, further comprising:
    determining a size for displaying the plurality of the identified images of the runway based on the rating of at least one of the plurality of the identified images of the runway.

3. The method of claim 1, further comprising:
    receiving a selection of one of the identified images of the runway; and
    displaying an image on the screen in response to receiving the selection of one of the identified images of the runway.

4. The method of claim 1, further comprising:
    receiving an adjustment indicator via a user interface element associated with the runway; and
    adjusting a size of the plurality of the identified images of the runway in response to receiving the adjustment indicator.

5. The method of claim 1, further comprising:
    receiving an adjustment indicator via a user interface element associated with the runway; and
    fixing the size of the plurality of the identified images of the runway in response to receiving the adjustment indicator.

6. The method of claim 1, further comprising:
    receiving a selection of one of the identified images of the runway; and
    displaying a second map on the screen in response to receiving the selection of one of the identified images of the runway.

7. The method of claim 6, wherein displaying the second map on the screen includes changing a map viewing mode.

8. The method of 1, further comprising:
    displaying a user-selectable map view image in the runway;

receiving a selection of the user-selectable map view image; and displaying the map in a different map viewing mode in response to receiving the selection of the user-selectable map view image.

9. The method of 1, further comprising:

displaying a user-selectable composite view image in the runway;

receiving a selection of the user-selectable composite view image; and displaying the images of the runway in a grid on the screen in response to receiving the selection of the user-selectable composite view image.

10. The method of 1, further comprising:

receiving a pre-selection of one of the identified images of the runway;

indicating an approximate location on the map of the object associated with the pre-selected identified image.

11. A computing device for a map rendering system, the computing device capable of being communicatively coupled to a map displaying device having a user interface, the computing device comprising:

a processor;

a memory coupled to the processor;

a port coupled to the processor that receives a request for map information;

a map generating routine, that when executed by the processor, generates a map responsive to a request for map information, the map including a visual representation of a geographic area associated with the request for map information;

a database of stored photographic images, each stored image being associated with an object having a geographic location;

an image identifying routine, that when executed by the processor, identifies images stored within the database that are associated with objects located within the geographic area represented by the map;

an image rating routine, that when executed by the processor, rates identified images, the image rating routine includes at least one viewing signal to rate the image, the viewing signals including image type, image quality, image popularity, and spatial perspective;

a runway generating routine, that when executed by the processor, generates a plurality of identified images for display over the map, the plurality of identified images being arranged in the runway in a sequence determined by the rating of each identified image; and, a communication routine, that when executed by the processor, transmits the map and runway to the map display device for display via the user interface.

12. The computing device of claim 11, further including:

a sizing routine, when executed by the processor, adjusts the size of at least one of the plurality of identified images displayed within the runway based on the rating of at least one of the plurality of the identified images of the runway.

13. The computing device of claim 11, further including:

at least one identified image within the runway being selectable as an entry point into a different viewing mode.

14. A tangible non-transitory computer-readable medium having instructions stored there on that, when executed on by one or more processors, cause the one or more processors to:

generate a map in response to receiving a request for map information, the map including a visual representation of a geographic location;

transmit the map for display on a screen;

identify photographic images of objects located within the geographic location associated with the map;

rate each of the identified images using one or more viewing signals, the viewing signals including image type, image quality, image popularity, and spatial perspective;

generate a runway of a plurality of the identified images, the plurality of the identified images being arranged in the runway in a sequence determined by the rating associated with each identified image; and transmit the runway for display over the map.

15. The computer-readable medium of claim 14, further having instructions stored there on that, when executed on by the one or more processors, cause the one or more processors to:

determine a size for displaying the plurality of the identified images of the runway based on the rating of at least one of the plurality of the identified images of the runway.

16. The computer-readable medium of claim 14, further having instructions stored there on that, when executed on by the one or more processors, cause the one or more processors to:

adjust the size of the plurality of the identified images of the runway in response to receiving an adjustment of the runway from a user.

17. The computer-readable medium of claim 16, further having instructions stored there on that, when executed on by the one or more processors, cause the one or more processors to:

fix the size of the plurality of the identified images of the runway in response to receiving the adjustment of the runway from a user.

18. The computer-readable medium of claim 14, further having instructions stored there on that, when executed on by the one or more processors, cause the one or more processors to:

generate a second map in response to receiving a selection of one of the identified images of the runway;

transmitting the second map for display.

19. The computer-readable medium of claim 14, wherein the request for map information includes a search term.

20. The computer-readable medium of claim 14, wherein the one or more viewing signals includes a search term.

* * * * *